(12) United States Patent
Pham et al.

(10) Patent No.: US 12,554,228 B2
(45) Date of Patent: *Feb. 17, 2026

(54) GRIPPER DEVICE FOR MAINTAINING, CENTRING, AND/OR CLAMPING A MICROMECHANICAL OR HOROLOGICAL COMPONENT, AND ASSOCIATED FASTENING METHOD

(71) Applicant: ETA SA Manufacture Horlogère Suisse, Grenchen (CH)

(72) Inventors: Patric Pham, Utzenstorf (CH); Christophe Donzé, Pieterlen (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,425

(22) Filed: Sep. 13, 2023

(65) Prior Publication Data

US 2024/0168441 A1  May 23, 2024

(30) Foreign Application Priority Data

Nov. 17, 2022  (EP) ..................... 22208083

(51) Int. Cl.
*G04D 1/06* (2006.01)
*B23B 31/20* (2006.01)
(Continued)

(52) U.S. Cl.
CPC .............. *G04D 1/06* (2013.01); *B23B 31/20* (2013.01); *B23B 31/202* (2013.01);
(Continued)

(58) Field of Classification Search
CPC ................... G04D 1/06; G04D 1/0085; G04D 1/0078–0078; B25J 11/005;
(Continued)

(56) References Cited

U.S. PATENT DOCUMENTS 3,648,853 A * 3/1972 Winne ..................... B23Q 7/04
294/64.2
6,098,662 A * 8/2000 Gregoire .............. G05D 16/187
137/895

(Continued)

FOREIGN PATENT DOCUMENTS

CN 113043314 A 6/2021
EP 1 602 426 B1 10/2013
(Continued)

OTHER PUBLICATIONS

European Search Report for EP 22208083 dated Mar. 30, 2023.

*Primary Examiner* — Matthew P Travers
(74) *Attorney, Agent, or Firm* — Sughrue Mion, PLLC

(57) ABSTRACT

A gripper device (100) for maintaining, centring, and/or clamping a micromechanical or horological component (200) in a clamping chamber defined by a clamp including at least one mobile jaw (2). At least a part of the mobile jaws (2) includes a reference surface (20) for frontal bearing of a component (200), and the gripper device (100) includes a vacuum generator (60) for creating the vacuum in the clamping chamber. Also, a method for fastening a micromechanical or horological component (200) in the clamping chamber of such a gripper device (100) according to which the component (200) is disposed on the reference surface (20), then a first maintaining by vacuum is carried out, then a second maintaining having a torque greater than that of the first maintaining by pivoting of the mobile jaws (2).

11 Claims, 5 Drawing Sheets

(51) Int. Cl.
  *B23B 31/30* (2006.01)
  *B23Q 3/06* (2006.01)
  *B25B 11/00* (2006.01)
  *G04D 1/00* (2006.01)

(52) U.S. Cl.
  CPC .......... *B23B 31/307* (2013.01); *B23Q 3/067* (2013.01); *B25B 11/005* (2013.01); *G04D 1/0078* (2013.01); *G04D 1/0085* (2013.01); *B23B 2231/20* (2013.01); *B23B 2231/2027* (2013.01); *B23B 2231/2045* (2013.01); *B23B 2231/2075* (2013.01)

(58) Field of Classification Search
  CPC .......... B25J 15/0625; B23Q 3/088; B23Q 3/067–068; B32B 31/202; B32B 2231/2027; B32B 2231/2045; B32B 2231/2072–2231/2075; B23B 31/20; B23B 2231/20; B23B 31/307; B25B 11/005; Y10T 279/17291–17358
  See application file for complete search history.

(56) References Cited

U.S. PATENT DOCUMENTS

| | | |
|---|---|---|
| 7,429,049 B2 | 9/2008 | Kramer |
| 2005/0248103 A1* | 11/2005 | Kramer ............... B23B 31/208 279/43 |
| 2015/0251321 A1* | 9/2015 | Ishikawa ............ B25J 15/0047 294/183 |
| 2016/0089793 A1 | 3/2016 | Truebenbach |
| 2019/0168396 A1* | 6/2019 | Leidenfrost ........... B25J 9/1697 |
| 2021/0078082 A1 | 3/2021 | Maurer |
| 2024/0165715 A1* | 5/2024 | Pham .................. G04D 1/0085 |

FOREIGN PATENT DOCUMENTS

| | | |
|---|---|---|
| JP | 2005-319580 A | 11/2005 |
| JP | 2015-168039 A | 9/2015 |
| JP | 2021-41528 A | 3/2021 |
| JP | 2022-508622 A | 1/2022 |
| KR | 10-2012-0027863 A | 3/2012 |

* cited by examiner

Fig. 12
Fig. 13
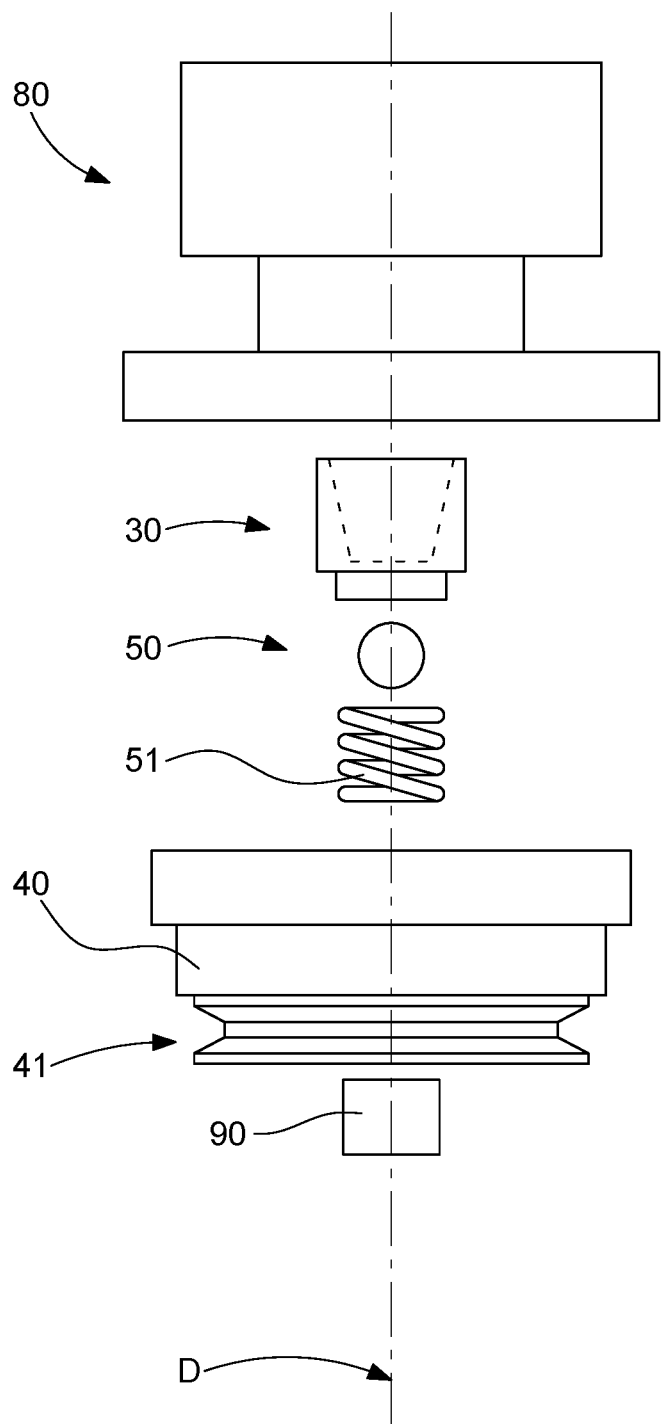
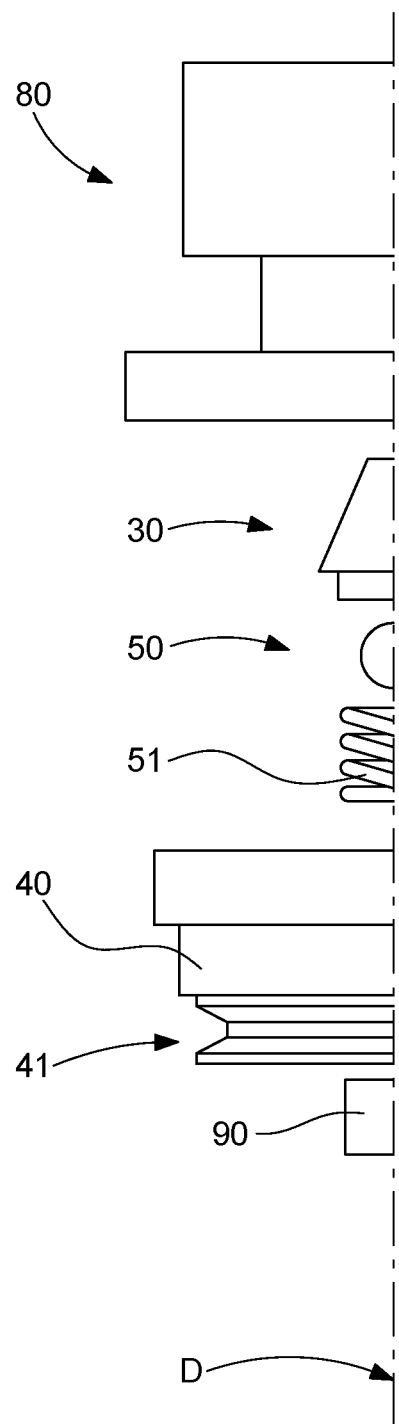

GRIPPER DEVICE FOR MAINTAINING, CENTRING, AND/OR CLAMPING A MICROMECHANICAL OR HOROLOGICAL COMPONENT, AND ASSOCIATED FASTENING METHOD

CROSS REFERENCE TO RELATED APPLICATION

This application claims priority to European Patent Application No. 22208083.0 filed Nov. 17, 2022, the entire contents of which are incorporated herein by reference.

TECHNICAL FIELD OF THE INVENTION

The invention relates to a gripper device for maintaining, centring, and/or clamping a micromechanical or horological component in a clamping chamber defined by a clamp including at least one mobile jaw.

The invention also relates to a method for fastening such a micromechanical or horological component in the clamping chamber that such a gripper device includes.

The invention relates to the field of micromechanics, the positioning and the clamping of the components during a manufacturing step, or the positioning and the clamping of the tools during a manufacturing step.

TECHNOLOGICAL BACKGROUND

The very precise positioning of micromechanical components, in particular horological, in manufacturing equipment is always complicated. It is necessary to reconcile this precise positioning with adequate clamping, without inducing undue deformation. The problem is similar for the positioning and the maintaining of the microtools used in the manufacturing operations, and often requires perfect angular indexing.

Among the existing clamping means, numerous variants of chucks with clamps are known, these clamps being elastic or articulated to maintain the component. In particular, in the conventional clamping means, it is very frequent in horology to use clamping of the "Ottet" clamp type. This type of clamping allows to clamp components by opening or by closing clamp segments that deform elastically, in general under the combined action according to an axial direction of a nut-bolt system, of an elastic return means such as a spring, of a push-piece such as a ball or similar bearing on this elastic return means, and of a closing or opening cone cooperating with sectors having a conical or rounded profile, which the segments include. These segments are provided to be machined, most of the time on the inside, in order to best conform to the contours of the component to be clamped, and they can be machined in place in the machine for maximum precision. The clamp is itself mounted on a plate that can be clamped/unclamped on an automatic clamping device generally provided on the table of a machining machine. The cone clamping principle of such a clamp is described in the document EP1602426B1.

However, since the segments must pivot to clamp the component, there is no reference support fixed in space in order to ensure the height and the location of the components. In other words, if a component is clamped with this type of clamp, it is difficult to guarantee its position, both axial and radial, with precision. It suffices for example that the component not have exactly the same dimensions, or that the friction between the various segments and the clamping cone change, in order for the relative position of the component with respect to the clamp to be slightly modified. This problem is even more important for corrective machining which requires machining operations in a localised manner with respect to preceding operations.

When a precision support is required, it is generally no longer possible to use this type of standard elastic clamp, since the space available at the centre of the clamping is reserved for the mechanical components which transmit the clamping/unclamping stresses.

Consequently, in these cases, more customised solutions are generally required and thus less flexible, more bulky and more costly.

Another problem is maintaining after an operation of machining a machined component cut out of a raw component, which alone remains maintained in the clamps.

It is noted, again, that with the tendency towards miniaturisation of the machines for micromechanical machining, it is necessary today to build more and more compact clamping means that guarantee all the desired functionalities, the necessary rigidity and precision.

SUMMARY OF THE INVENTION

The invention intends to improve the positioning and the clamping of a micromechanical or horological component, or tool, in a gripper device, with incorporation into the latter of a maintaining by vacuum, complementary to a conventional mechanical clamping, or replacing such a clamping. For this purpose, the invention relates to a gripper device for maintaining, centring, and/or clamping a micromechanical or horological component according to claim 1.

The present invention can thus solve this problem by the modification of a standard clamp coming from the market, of a recognised and widespread model, which makes the manufacturing of a gripper device according to the invention very economical. Moreover, such a modification does not modify the outer bulk of the clamp.

As for the problem of maintaining a machined component cut out of a raw component maintained in clamps, it can be solved by such a gripper including vacuum maintaining means. However, a standard clamp does not have such a system, whereas it is necessary, after cutting out, to maintain such a machined component, to increase the force for maintaining this machined component, and to maintain it in position. Indeed, after cutting out, the clamp can continue to clamp the remaining part of the raw component; the machined component itself is no longer clamped, whether the clamp is clamped or not.

The present invention also solves this problem and allows to provide vacuum at the component to be maintained, also on the basis of a modified standard clamp.

Another aspect of the invention relates to a method for fastening such a micromechanical or horological component in the clamping chamber that such a gripper device includes.

BRIEF DESCRIPTION OF THE DRAWINGS

The goal, advantages and features of the invention will be clearer upon reading the following detailed description, in reference to the appended drawings, in which:

FIG. 12 shows, schematically, exploded and in a side view, the basic components of an elastic clamp usable to produce a gripper device according to one of FIGS. 1 to 11, with a closing cone;

FIG. 13 shows, schematically, exploded and in a side view, the basic components of an elastic clamp usable to produce a gripper device according to another embodiment, with an opening cone.

DETAILED DESCRIPTION OF THE INVENTION

Figure 1:
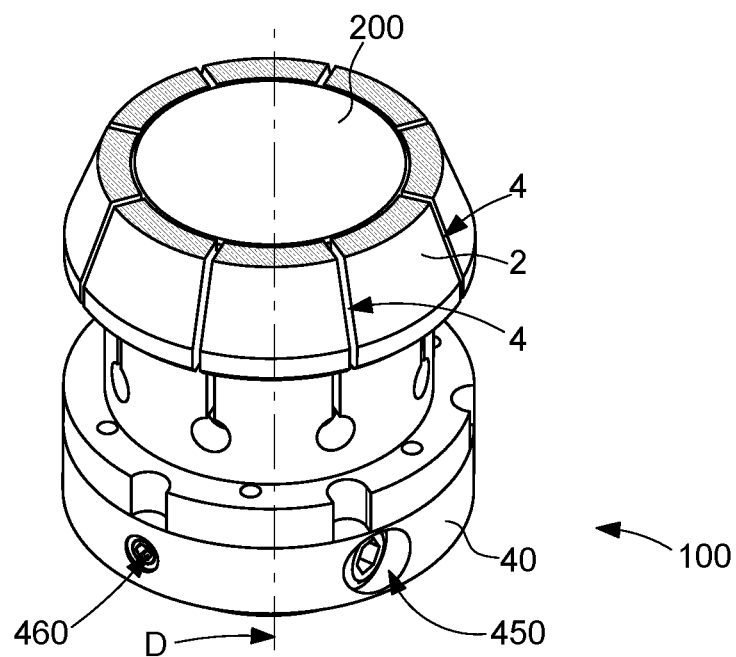
FIG. 1 shows, schematically and in perspective, a gripper device according to the invention, produced on the basis of an elastic clamp from the market including a plurality of jaws separated by slots; this elastic clamp is of the type with substantially concentric clamping about a clamp axis; this clamp only includes mobile jaws.
Figure 2:
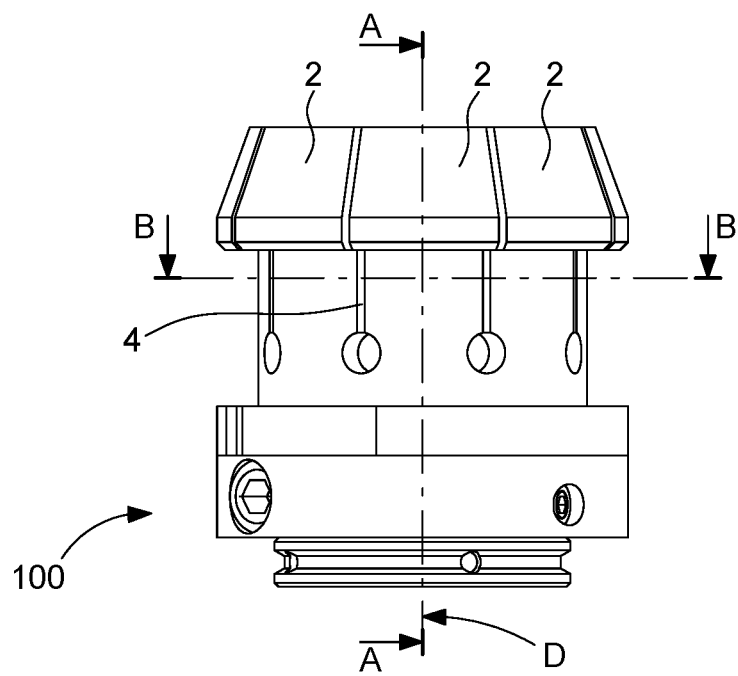
FIG. 2 shows, schematically and in a side view, the gripper device of FIG. 1.
Figure 3:
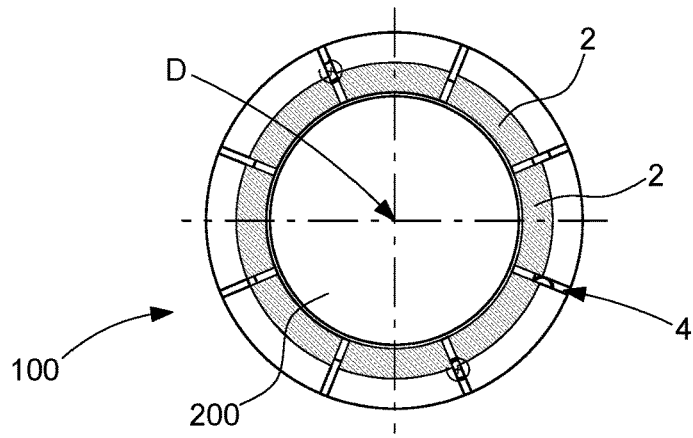
FIG. 3 shows, schematically and in a top view, the gripper device of FIG. 1.
Figure 4:
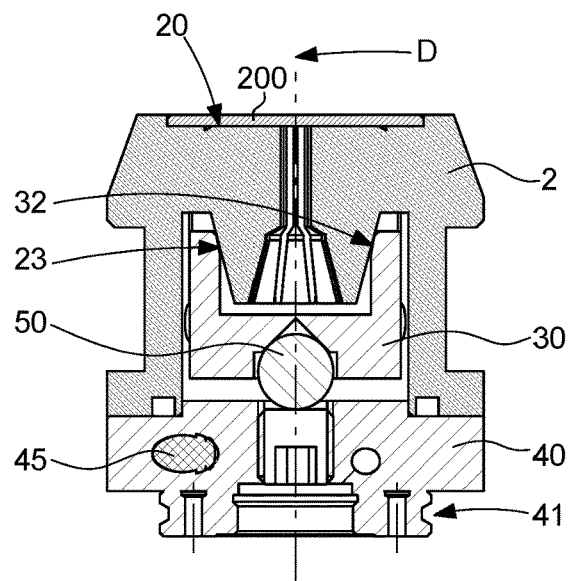
FIG. 4 shows, schematically and in a cross-sectional view along the cut A-A defined by FIG. 2, the gripper device of FIG. 1; in the plate, channels for passage of air, and a portion of a chamber for housing a venturi acting as a vacuum generator, are visible; the upper ends of the mobile jaws are arranged to carry and clamp the component to be positioned and to clamp.
Figure 5:
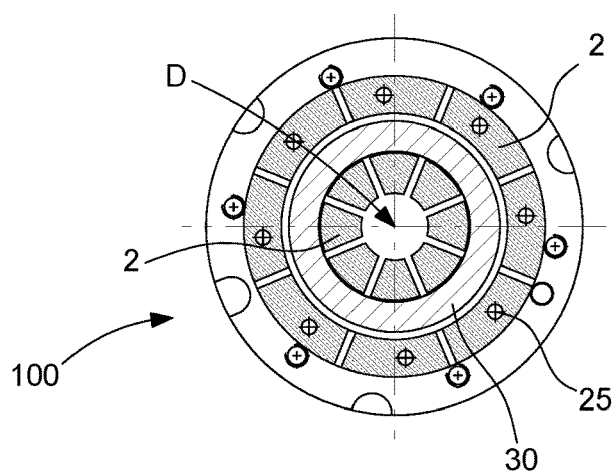
FIG. 5 shows, schematically and in a cross-sectional view according to the cut B-B defined by FIG. 2, the gripper device of FIG. 1; all of the mobile jaws, which all include actuation cones, are visible; channels of the vacuum circuit for maintaining the component by vacuum on the front ends of the mobile jaws are also visible.
Figure 6:
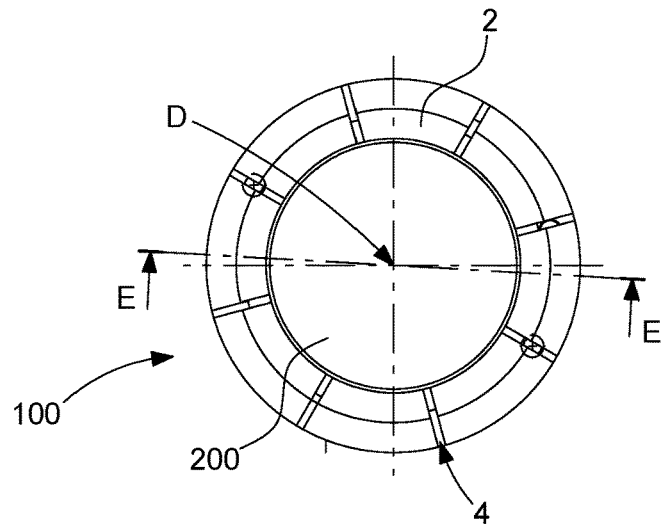
FIG. 6 shows, in a manner similar to FIG. 3, the gripper device of FIG. 1 after pivoting of the jaws.
Figure 7:
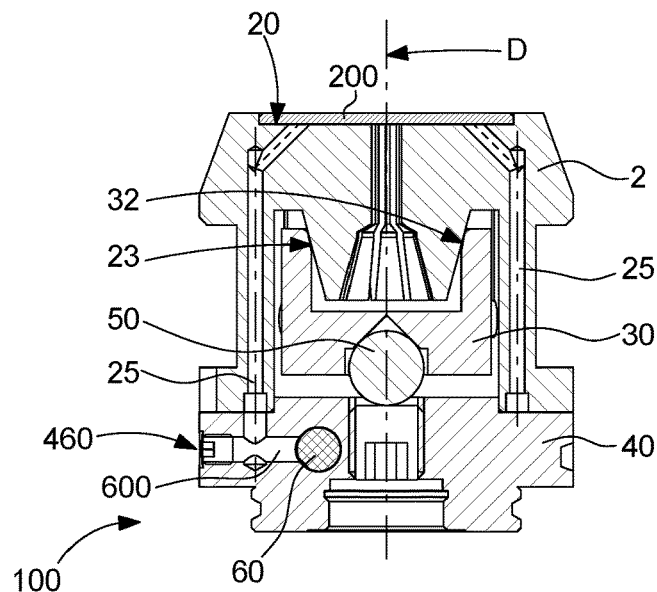
FIG. 7 shows, in a manner similar to FIG. 4, the gripper device of FIG. 1 in a cross-sectional view according to the cut E-E defined by FIG. 6, and shows the mobile jaws and a channel of the vacuum circuit communicating with the suction zone created by the venturi visible in the lower part of the drawing.
Figure 8:
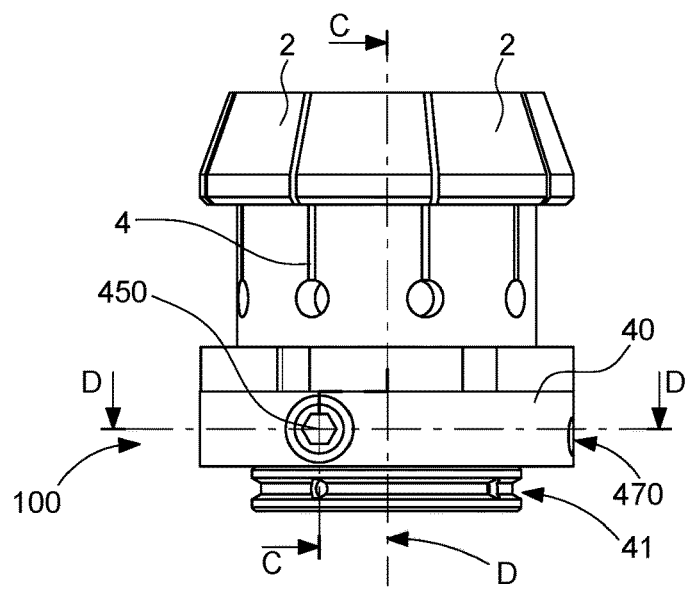
FIG. 8 shows, in a manner similar to FIG. 2, the gripper device of FIG. 1 after pivoting of the jaws.
Figure 9:
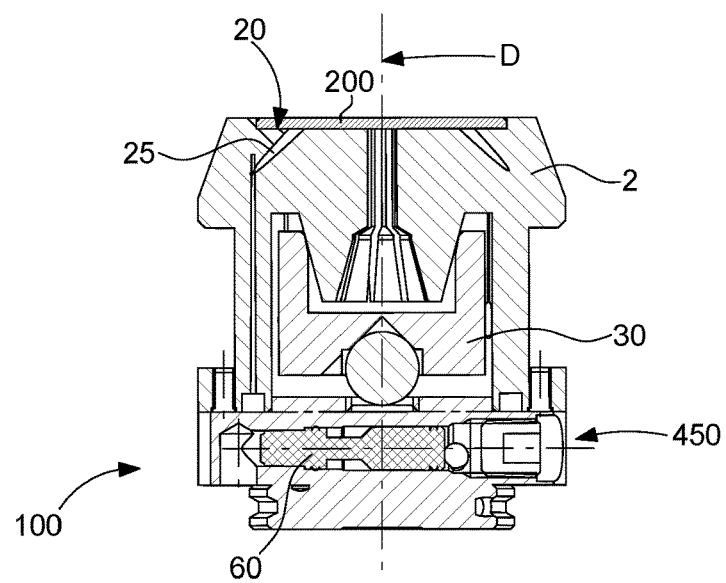
FIG. 9 shows, in a manners similar to FIG. 7, the gripper device of FIG. 1 in a cross-sectional view according to the cut C-C defined by FIG. 8, and shows the venturi in its channel.
Figure 10:
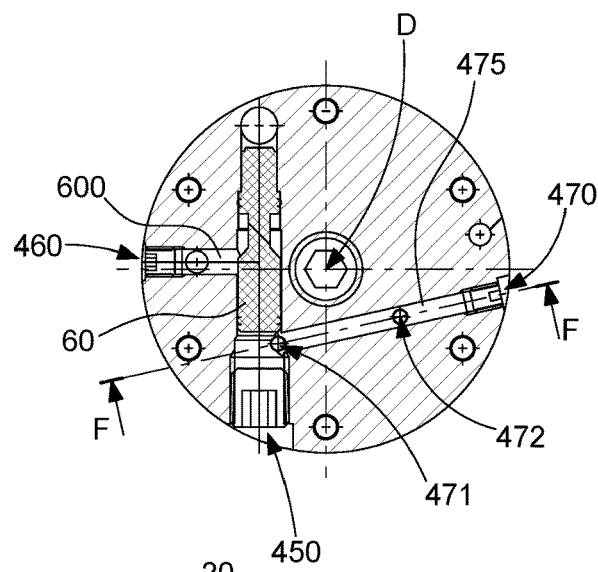
FIG. 10 shows the gripper device of FIG. 1 in a cross-sectional view according to the cutting plane D-D defined by FIG. 8, and shows the venturi in its channel, as well as the neighbouring channels for blowing and evacuation.
Figure 11:
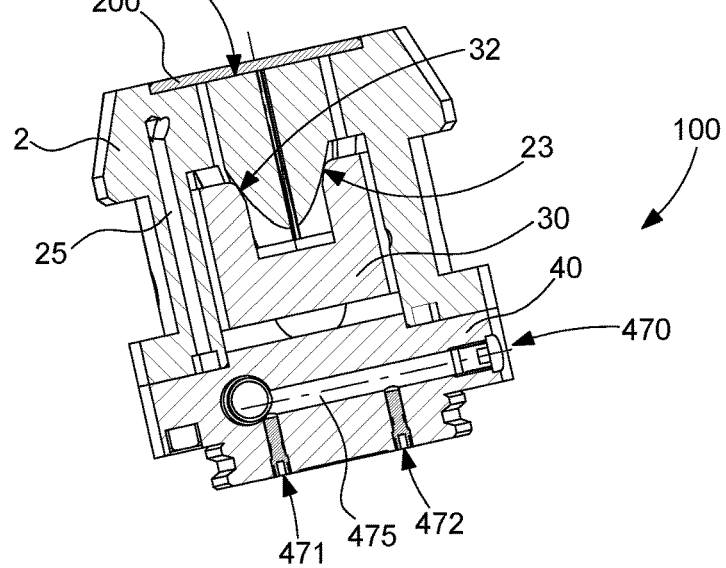
FIG. 11 shows the gripper device of FIG. 1 in a cross-sectional view according to the cutting plane F-F defined by FIG. 10, and shows the blowing channel with its two blowing tracks, and a part of the suction duct in one of the mobile jaws.

The invention relates to a gripper device 100 for maintaining, centring, and/or clamping a micromechanical or horological component 200 in a clamping chamber defined by a clamp including at least one mobile jaw 2.

More particularly, and in the non-limiting version illustrated by the drawings, the invention relates to a gripper with a clamp with substantially concentric jaws, distributed around a clamp axis D; the principles of the invention that will be described below are however applicable to other manufacturing equipment, of the vice type, or special equipment with mobile jaws.

In the non-limiting alternatives illustrated by the drawings, the invention is carried out by the modification of clamps from the market (of the "Ottet" clamp type or similar) in order to add a maintaining by vacuum with great compactness.

The maintaining by vacuum allows several options, and in particular to:
   cut out a machined component coming from a clamped raw component, by maintaining via vacuum this machined component on an impression of the clamp, while the rest of the raw component remains clamped in the clamp;
   increase the force for maintaining the component against the support;
   maintain the component in place, after the unclamping and the placing in the unclamped position, while waiting for example for an operator or a robot to carry out a loading/unloading of components.

The example illustrated relates to the use of a standard clamp as a clamping base, with the economical modification of standard clamps of the "Ottet" clamp type or similar.

This modified clamp is provided to be assembled onto a plate 40 provided with a standard interface 41 proposed by suppliers such as "Erowa", "Yerly", "TG-Colin" or others, in order to be interchangeable and be provided on any type of machine with this clamping means. In an alternative embodiment, this device can also be directly fastened onto any shaft nose.

The clamping/unclamping of the components can be carried out either manually with a screw, outside of the machine, or automatically, for example and in a non-limiting way with a control rod provided on the machine.

The gripper device 100 includes a cone 30, which is an element that allows to close, respectively open, the clamp, according to its closing/opening shape, as visible in FIGS. 12 (closing cone) and 13 (opening cone).

The actuation of the mobile jaws 2 is carried out by the cooperation between on the one hand the closing or opening control cone 30, moved via a clamping screw 90 passing through the plate 40 and arranged to push the thrust means 50, in particular a ball or a shuttle push-piece, which is combined with an axial elastic return means 51 such as a spring, this cone 30 including conical surfaces 32, and on the other hand complementary changeable surfaces 23, in particular conical surfaces that the mobile jaws 2 incorporated into the clamp include. Naturally the conical surfaces of the cone 30 and of the jaws can be replaced by other surfaces with a changeable profile.

Thus, according to the invention, at least one mobile jaw 2, or when the clamp includes a plurality of jaws at least a part of the mobile jaws 2 of the clamp, includes a reference surface 20, which is arranged for direct frontal bearing of a component 200.

And the gripper device 100 includes at least one vacuum generator 60 which is arranged to create the vacuum in the clamping chamber via at least one channel 25 made in at least one mobile jaw 2.

More particularly, the gripper device 100 includes, aligned according to a clamp axis D, a plate 40 including gripping means 41 arranged to cooperate with a piece of equipment and/or a manipulator, and an actuator device arranged to control the opening or the closing of the clamp.

In a specific embodiment, this actuator device includes a rotary ring around the clamp axis D to control the closing of the clamp, by pushing on mobile jaws 2 that the clamp includes.

In another specific embodiment illustrated by the drawings, the gripper device 100 includes, according to the clamp axis D, through this plate 40 or around it a manoeuvring means 90, such as a screw, a nut, or a push or pull rod, to actuate pushing means 50 on an elastic support, and a closing or opening cone 30, including changeable surfaces 32, in particular conical, that are arranged to cooperate with complementary surfaces 23 that the mobile jaws 2 include, and which form surfaces for actuating the clamp.

More particularly, the gripper device 100 includes at least one vacuum generator 60 arranged to create the vacuum in the clamping chamber via at least one channel 25 made in at least one mobile jaw 2. This at least one vacuum generator 60 includes more particularly a venturi cartridge, which is positioned between an inlet circuit for blowing air via at least one blowing track 471, 472, an air outlet circuit 460, and a suction zone 600 in which a vacuum transmitted to the clamping chamber by this at least one channel 25 is created during a blowing of air at the inlet.

Advantageously the gripper device 100 includes the vacuum generator 60 including a venturi cartridge housed in a main orifice 450, and auxiliary orifices 460, 470, defining air circulation channels including at least one blowing channel 475 supplied by at least one blowing track 471, 472.

More particularly, it is the plate 40 that includes the vacuum generator 60 including a venturi cartridge housed in a channel 45 with a main orifice 450, and auxiliary orifices 460, 470, defining air circulation channels, including at least one blowing channel 475 supplied by at least one blowing track 471, 472; in a non-limiting specific embodiment, this at least one track and these orifices are limited by check valves and/or bushes.

In another alternative, some of these orifices are kept open.

In a specific embodiment illustrated by the drawings, the gripper device 100 includes only mobile jaws 2.

A blowing pressure between 4 and 6 bar at the blowing tracks 471 and 472 allows, with a "FESTO" venturi of the "VN-05-H" or "VN-05-L" type, in a housing having a diameter of 6 mm, to achieve the desired vacuum in the chamber.

With regard to the clamping means of the clamps, the drawing presents a screw as the manual clamping/unclamping means. However, if the machine is equipped with a control rod that passes through the centre of the plate, then the control rod can replace the screw as an automatic clamping/unclamping means if it is powerful enough.

The invention also relates to a method for fastening a micromechanical or horological component 200 in the clamping chamber of such a gripper device 100, according to which: the component 200 is disposed on the reference surface 20, directly bearing on orifices of a network under vacuum opening from the mobile jaws 2 at this reference surface 20, then a first maintaining by vacuum is carried out, then a second maintaining having a torque greater than that of the first maintaining by pivoting of the mobile jaws 2.

Naturally, the indexing in position, and in particular in angular position, of the component 200 can be carried out by any means, the simplest and the least costly being the pin. In one alternative, if working with a standardised blank that has a reference such as a notch for example, it can be advantageous to have an orientation in the jaws. The solution illustrated allows to correct the machined component 200 once it has been cut out, if it is necessary to correct the finished part for example.

More particularly, the gripper device 100 is provided with at least one vacuum generator 60, a component 200 that is a blank is maintained in the mobile jaws 2, a machined component, which is maintained by vacuum before its recovery by an operator or by a robotic manipulator, is cut out of this blank.

In short, the invention allows the economical creation of a gripper device guaranteeing good clamping of the component; in particular it can be carried out by the modification of a recognised and widespread standard clamping means, such as a clamp of the "Ottet" clamp type or similar.

The invention provides a gain in machining precision, in particular for machining corrections, since the reference support allows better repeatability of positioning.

The invention offers the possibility of taking advantage of the vacuum for various functions: totally cutting out a machined component, improving the maintaining of the component, maintaining a component with unclamped clamps.

The compactness of the invention is perfectly in line with the trend towards miniaturisation of the machining means in micromechanics, with a bulk that justly satisfies the dimensional needs of current micromachines while integrating complementary functions.

The invention claimed is:

1. A gripper device (100) for maintaining, centring, and/or clamping a micromechanical or horological component (200) in a clamping chamber defined by a clamp including a plurality of jaws comprising at least one first mobile jaw (2), that is mobile radially with respect to a longitudinal axis of the clamp, and at least one second mobile jaw (2),
    wherein said at least one first mobile jaw (2) includes a reference surface (20) arranged for direct axial bearing of said component (200) lying flatly along the reference surface (20) from the at least one first mobile jaw (2) to the at least one second mobile jaw (2), and wherein said gripper device (100) includes at least one vacuum generator (60) arranged to create a vacuum in said clamping chamber via at least one channel (25) made in the at least one said mobile jaw (2), and
    wherein the gripper device (100) further includes an actuator device arranged to control opening or closing of said clamp and includes pushing means (50) on an elastic support, a closing or opening cone (30), including conical surfaces (32) arranged to cooperate with complementary surfaces (23) that said mobile jaws (2) include and which form surfaces for actuating said clamp.

2. The gripper device (100) according to claim 1, wherein said gripper device (100) includes, aligned according to a clamp axis (D), a plate (40) including gripping means (41) arranged to cooperate with a piece of equipment and/or a manipulator.

3. The gripper device (100) according to claim 1, wherein said at least one vacuum generator (60) includes a venturi cartridge positioned between an inlet circuit for blowing air via at least one blowing track (471, 472), and a suction zone (600) in which a vacuum transmitted to said clamping chamber by said at least one channel (25) is created during a blowing of air at an inlet.

4. The gripper device (100) according to claim 3, wherein said gripper device (100) includes said vacuum generator (60) housed in a main orifice (450), and auxiliary orifices (460, 470) defining air circulation channels including at least one blowing channel (475) supplied by at least one said blowing track (471, 472).

5. The gripper device (100) according to claim 4, wherein said gripper device includes a plate (40) including said vacuum generator (60), said venturi cartridge, said main orifice (450), said auxiliary orifices (460, 470), said blowing channel (475), said at least one said blowing track (471, 472), and check valves.

6. The gripper device (100) according to claim 1, wherein the direct axial bearing of said component (200) lying flatly along the reference surface (20) from the at least one first mobile jaw (2) to the at least one second mobile jaw (2) further comprises said component (200) lying flatly along an entirety of the reference surface (20).

7. The gripper device (100) according to claim 6, wherein the direct axial bearing of said component (200) lying flatly along a first portion of the reference surface (20) from the at least one first mobile jaw (2) to the at least one second mobile jaw (2) further comprises said component (200) lying flatly along a second portion of the reference surface of said mobile jaws (2) while lying flatly along the first portion of the reference surface (20).

8. A method for fastening a micromechanical or horological component (200) in the clamping chamber of the gripper device (100) according to claim 1, comprising disposing: said component (200) on said reference surface (20), directly bearing on orifices of a network under vacuum opening the mobile jaws (2) at said reference surface (20), then carrying out a first maintaining by vacuum, then carrying out a second maintaining having a torque greater than that of said first maintaining by pivoting of said mobile jaws (2).

9. The fastening method according to claim 8, wherein the component (200) is a blank and maintained in said mobile jaws (2), and a machined component, which is maintained by vacuum before its recovery by an operator or by a robotic manipulator, is cut out of said blank.

10. A gripper device (100) for maintaining, centring, and/or clamping a micromechanical or horological component (200) in a clamping chamber defined by a clamp including a plurality of jaws comprising at least one first mobile jaw (2), that is mobile radially with respect to a longitudinal axis of the clamp, and at least one second mobile jaw (2), wherein said at least one first mobile jaw (2), includes a reference surface (20) arranged for direct axial bearing of said component (200), and wherein said gripper device (100) includes at least one vacuum generator (60) arranged to create a vacuum in said clamping chamber via at least one channel (25) made in the at least one said mobile jaw (2), and wherein said gripper device (100) includes an actuator device that includes pushing means (50) on an elastic support, a closing or opening cone (30), including conical surfaces (32) arranged to cooperate with complementary surfaces (23) that said plurality of jaws include and which form surfaces for actuating said clamp.

11. A gripper device (100) for maintaining, centring, and/or clamping a micromechanical or horological component (200) in a clamping chamber defined by a clamp including a plurality of jaws comprising at least one first mobile jaw (2), that is mobile radially with respect to a longitudinal axis of the clamp, and at least one second mobile jaw (2), wherein said at least one first mobile jaw (2) includes a reference surface (20) arranged for direct axial bearing of said component (200), and wherein said gripper device (100) includes at least one vacuum generator (60) arranged to create a vacuum in said clamping chamber via at least one channel (25) made in the at least one said mobile jaw (2), and wherein said at least one vacuum generator (60) includes a venturi cartridge positioned between an inlet circuit for blowing air via at least one blowing track (471, 472), and a suction zone (600) in which the vacuum transmitted to said clamping chamber by said at least one channel (25) is created during a blowing of air at an inlet, and wherein the gripper device (100) further includes an actuator device arranged to control opening or closing of said clamp and includes pushing means (50) on an elastic support, a closing or opening cone (30), including conical surfaces (32) arranged to cooperate with complementary surfaces (23) that said mobile jaws (2) include and which form surfaces for actuating said clamp.

\* \* \* \* \*